US012769812B2

(12) United States Patent
Wang

(10) Patent No.: US 12,769,812 B2
(45) Date of Patent: Oct. 20, 2026

(54) EDUCATIONAL METAVERSE INTERACTIVE PLATFORM CAPABLE OF LOADING PERSONAL ASSOCIATED DATA

(71) Applicant: NATIONAL UNIVERSITY OF KAOHSIUNG, Kaohsiung City (TW)

(72) Inventor: Zheng-Hong Wang, Tainan City (TW)

(73) Assignee: NATIONAL UNIVERSITY OF KAOHSIUNG, Kaohsiung City (TW)

( * ) Notice: Subject to any disclaimer, the term of this patent is extended or adjusted under 35 U.S.C. 154(b) by 70 days.

(21) Appl. No.: 19/083,468

(22) Filed: Mar. 19, 2025

(65) Prior Publication Data

US 2026/0178711 A1 Jun. 25, 2026

(30) Foreign Application Priority Data

Dec. 24, 2024 (TW) ................................ 113150459

(51) Int. Cl.
*G06F 21/31* (2013.01)
*G06F 3/01* (2006.01)
*G06T 11/00* (2006.01)

(52) U.S. Cl.
CPC .............. *G06F 21/31* (2013.01); *G06F 3/011* (2013.01); *G06T 11/00* (2013.01)

(58) Field of Classification Search
None
See application file for complete search history.

(56) References Cited

U.S. PATENT DOCUMENTS

2020/0197818 A1* 6/2020 Ma .......................... A63F 13/58
2023/0326149 A1* 10/2023 Werner ................... G06F 3/147 345/419
2024/0177433 A1* 5/2024 Werner ................... G06F 3/147
2024/0367059 A1 11/2024 Belliveau et al.
2024/0378530 A1 11/2024 Chakravarthi et al.
2026/0111769 A1* 4/2026 Varanasi .................. G06N 5/04

* cited by examiner

*Primary Examiner* — William J. Goodchild
(74) *Attorney, Agent, or Firm* — WPAT, PC

(57) ABSTRACT

An educational metaverse interactive platform includes an external processing module, a verification device, an external user database and a user database coupled with each other. When the user has the biological information detected through the verification device, the external processing module receives and determines whether the biological information detected by the verification device and the biological information in the external verification information set are identical. If identical, the external processing module sends a corresponding control instruction to transmit the external personal associated data of the user from the external personal associated dataset to the user database of the educational metaverse interactive platform for storage.

10 Claims, 7 Drawing Sheets

EDUCATIONAL METAVERSE INTERACTIVE PLATFORM CAPABLE OF LOADING PERSONAL ASSOCIATED DATA

CROSS REFERENCE TO RELATED APPLICATION

The application claims the benefit of Taiwan application serial No. 113150459, filed on Dec. 24, 2024, and the entire contents of which are incorporated herein by reference.

BACKGROUND OF THE INVENTION

1. Field of the Invention

The present invention relates to an interactive platform and, more particularly, to an educational metaverse interactive platform capable of loading personal associated data.

2. Description of the Related Art

Along with the technological advancement, multiple software, hardware, systems and platforms that may implement metaverse virtual world scenes have been proposed, put into practice and have become more mature nowadays. In comparison with meetings, lectures and chats on video calls, researches show that activities in metaverse scenes may increase the participation and focus level of users effectively. Nevertheless, these kinds of interactive platforms may be too single-functional or incomplete. For example, the personal association data obtained by the user in a single interactive platform can only be used in that platform and cannot be used in a different interactive platform.

In light of the above, it is necessary to improve the conventional interactive platforms.

SUMMARY OF THE INVENTION

To solve the above problems, it is an objective of the present invention to provide an educational metaverse interactive platform that can load personal object obtained in other external platforms.

As used herein, the term “a”, “an” or “one” for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term “coupling” throughout the present invention includes direct or indirect electrical and/or signal connections, which may be selected by a person with ordinary knowledge in the art based on usage requirements.

As used herein, the terms “system”, “device”, “unit”, “database” and “module” described throughout the present invention may collectively or individually include at least one “processor”. The processor refers to various data processing devices with specific functions and implemented by hardware or a combination of hardware and software to process or analyze information and/or correspondingly generate control information. In addition, a corresponding data receiving or transmitting unit may be included to receive or transmit required data. In addition, a corresponding database or storage unit (especially a non-transient memory unit) may be included for reading and storing corresponding data. In particular, unless otherwise specifically excluded or contradicted, the processor may be a collection of multiple processors in an architecture based on a distributed system, which is used to include or represent processes, a mechanisms and results of information streaming among the multiple processors. Specifically, the above-mentioned functions of the processor are achievable by the “processing module” in the present invention.

As used herein, elements including “system”, “device”, “unit”, “database” and “module” described throughout the present invention have a mechanism for mutually transmitting and/or receiving signals, which is based on the corresponding hardware and matched software among the elements for achieving Internet of Things or information/data exchange, and which can be understood by a person with ordinary knowledge in the art.

An educational metaverse interactive platform according to the present invention includes a processing module, an image-playing equipment, a platform database, a physically-operated equipment, a verification device and an external platform. The processing module includes at least a processor. The image-playing equipment is coupled with the processing module to receive a control instruction from the processing module and generate a corresponding image. The platform database is coupled with the processing module and includes a character database, a scene database and an object database, respectively for providing character information, scene information and object information for the image-playing equipment to respectively generate a virtual character image, a scene image and a virtual object image. The platform database further includes a user database for storing personal associated data of a user. The physically-operated equipment is coupled to the processing module for the user to input an instruction or action. The processing module receives the instructions or action and generates a control instruction to control the image-playing equipment, making at least one of the virtual character image, the scene image and the virtual object image to change correspondingly. The verification device is configured for detecting biological information of each user. The external platform includes an external processing module and an external user database. The external user database includes an external verification information set and an external personal associated dataset. The external verification information set stores verification information for each user to log into the external platform, with the verification information including the biological information of each user. The external personal associated dataset includes external personal associated data of each user. The external processing module, the verification device, the external user database and the user database are coupled with each other, when the user has the biological information detected through the verification device, the external processing module receives and determines whether the biological information detected by the verification device and the biological information in the external verification information set are identical. When the biological information detected by the verification device and the biological information in the external verification information set are identical, the external processing module sends a corresponding control instruction to transmit the external personal associated data of the user from the external personal associated dataset to the user database of the educational metaverse interactive platform for storage.

Therefore, through the collaborative operation of the verification device, the interactive platform and the external platform, the educational metaverse interactive platform of the present application allows users to use their personal objects obtained from other external platforms in this interactive platform. Thus, through the collaborative operation of the verification device, the processing module, the verifying information database and the log-in module, fast verification of user identity and convenient log-in can be achieved.

In an example, the educational metaverse interactive platform further includes a platform module coupled with the processing module. The platform module includes a log-in module for the user to verify the identity to complete log-in procedure of the interactive platform. The user database includes a verification information database storing verification information for each user to log into the interactive platform, and the verification information includes the biological information of each user. The verification device, the processing module, the verifying information database and the log-in module are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the log-in module to activate the log-in module to complete the log-in procedure of the user. Thus, through the collaborative operation of the verification device, the processing module, the verifying information database, the character module and the preferred setting, fast verification of user identity and automatic loading of preferred virtual character can be achieved.

In an example, the educational metaverse interactive platform further includes a platform module coupled with the processing module. The platform module includes a character module coupled with the character database to display multiple prebuilt virtual characters through the image-playing equipment for the user to select. The user database has a verifying information database and a preferred setting. The verifying information database saves verification information of each user for logging in the educational metaverse interactive platform, and the verification information includes the biological information of the user. The preferred setting saves a predetermined association information, which records the choices of each user from the character database. The verification device, the processing module, the verifying information database, the character module and the preferred setting are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the character module to load in the predetermined association information saved in the preferred setting, to correspondingly link to the character database to load in a corresponding virtual character. Thus, through the collaborative operation of the verification device, the processing module, the verifying information database, the scene module, the platform database and the preferred setting, fast verification of user identity and automatic loading of preferred settings can be achieved.

In an example, the educational metaverse interactive platform further includes a platform module coupled with the processing module. The platform module includes a scene module, the scene module is coupled with the platform database to generate corresponding scene image. The scene module further includes a user scene providing each user a corresponding personal space for the user to select one or more of corresponding scene information and object information from the platform database. The user database having a verifying information database and a preferred setting. The verifying information database saves verification information of each user for logging in the educational metaverse interactive platform, and the verification information includes the biological information of the user. The preferred setting saves a predetermined association information, which records the choices of each user from the corresponding user scene. The verification device, the processing module, the verifying information database, the scene module, the platform database and the preferred setting are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the scene module to load in the predetermined association information saved in the preferred setting, to correspondingly link to the platform database to load in corresponding user scenes. Thus, through the collaborative operation of the verification device, the processing module, the verifying information database, the scene module, the platform database and the preferred setting, fast verification of user identity and automatic loading of user scenes in the preferred settings can be achieved.

In an example, the educational metaverse interactive platform further includes a platform module coupled with the processing module. The platform module includes a scene module, the scene module is coupled with the platform database to generate a corresponding scene image. The scene module includes a communication scene. An interface arrangement of the communication scene defines a public area and a limited area within the public area. When a virtual character of the user is in the public area, an information transmitted by the user is public. When the virtual character of the user is in the limited area, the information transmitted by the user is only receivable by corresponding virtual characters of other users who are in the limited area at the same time. Thus, by configuring the limited area within the public area though interface arrangement of the communication scene, allows users to enter the range of the limited area from the public area when private communications are required, realizing fast conversion between the respective functions of public and non-public communications.

In an example, in the scene image corresponding to the scene information, a user is granted management authorization to act as a scene manager, and other users are defined as managed users. The scene manager executes at least one of group association, position association, permission management and status determination for the managed users according to the management authorization. The group association is configured to designate groups among the managed users. The position association is configured to designate the managed user to move to specific coordinates in corresponding scenes. The permission management is configured to control operability of specific capabilities of the managed users in corresponding scenes. The status determination is configured to determine a status of interest of the managed user. Thus, by granting management authorization to the scene manager, status of the managed users can be adjusted, enabling various activities, especially teaching activities, to proceed smoothly.

In an example, the scene manager executes the group association to group the managed users who are not yet grouped according to a specific method. The specific method is random assignment, average assignment according to specific attributes or extreme assignment according to specific attributes. Thus, seat assignment of the managed users can be done swiftly by groups to facilitate discussion.

In an example, when the managed users are already grouped, the scene manager associates the managed users with corresponding seats according to grouping conditions, making the seats of the managed users in the same group adjacent to each other. Thus, seat assignment of the managed users in the same group can be done swiftly by area to facilitate discussion.

In an example, the educational metaverse interactive platform further includes an integration system coupled to the processing module. The integration system includes a reality module and a virtual module. The reality module includes a reality device which is a device in the real world and a reality controller coupled to the reality device for controlling operation of the reality device. The virtual module is coupled to the reality module and includes a virtual controller for the user to generate an operation input signal in a virtual scene. The reality controller receives the operation input signal and controls the reality device to generate a corresponding operation according to the operation input signal. Thus, by the configuration of the virtual-reality integration system, the control in the virtual scene can lead to an operation of the reality device in the real world.

In an example, the reality module further includes a reality sensor and basic information. The reality sensor is disposed in at least one of the reality controller, the reality device and an actual environment to detect information of interest from the reality controller, the reality device or the actual environment. The basic information records requirement information and/or limitation information of the actual environment where the reality device is applied. The requirement information is resource information required for one-time operation of the reality device. The limitation information is limitative information that the reality device cannot exceed during an operation. The processing module or the virtual controller receives and calculates a limit value of an operable value of a corresponding reality device based on a relationship between the information of interest and the basic information, for the user to input the corresponding operation input signal within a range of the limit value of the operable value. Thus, with the limit value of the operable value, it is convenient for the user to perform operation.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
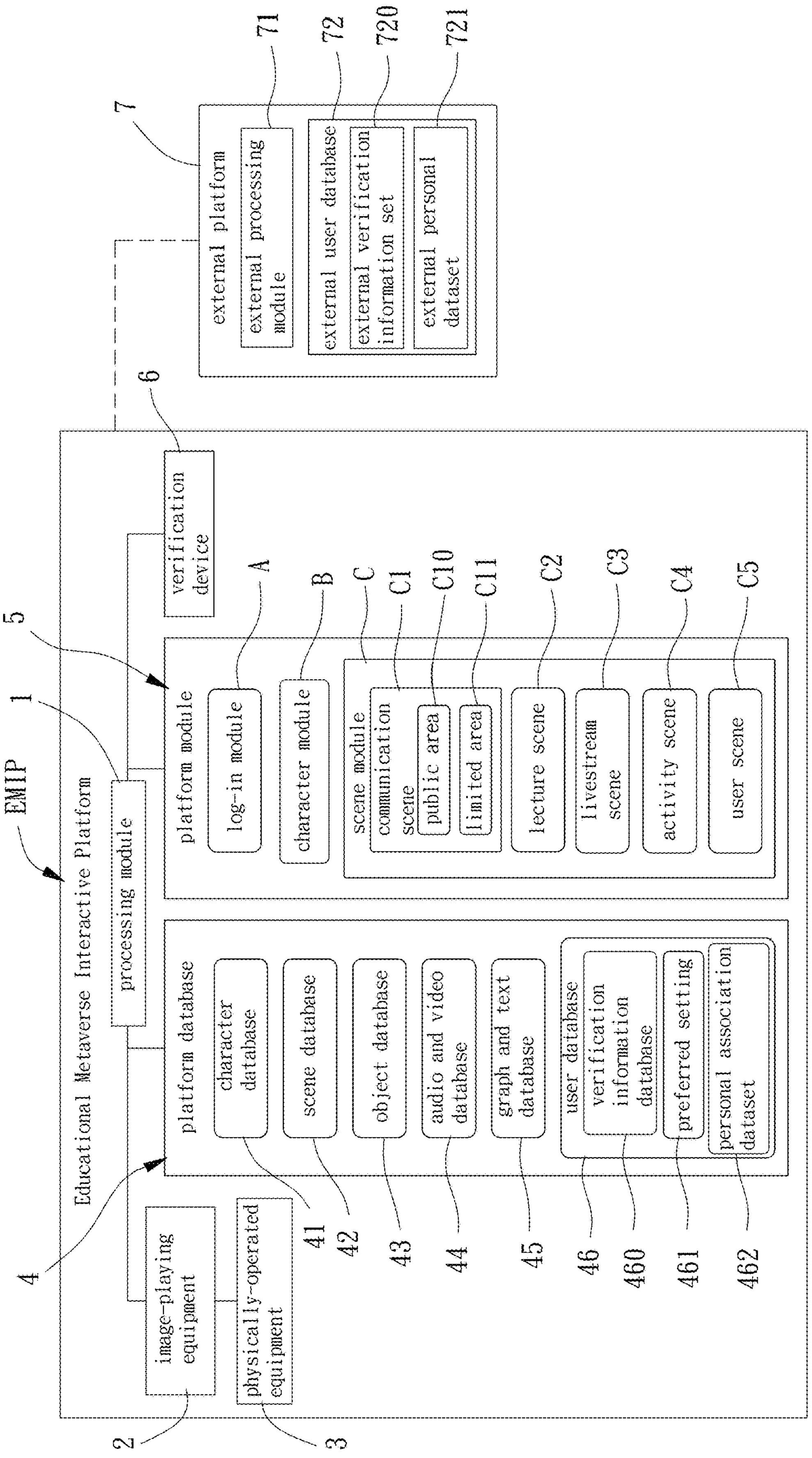
FIG. 1 is a block diagram showing a preferred embodiment of the educational metaverse interactive platform according to the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

FIG. 1 shows a preferred embodiment of the educational metaverse interactive platform EMIP according to the present invention, in order to provide a user with a visional image, especially an immersive visional image that allows the users to enter a Metaverse/Cyber-physical Integration/Virtual Reality scene. The educational metaverse interactive platform EMIP includes a processing module 1, an image-playing equipment 2, a physically-operated equipment 3, a platform database 4, optionally a platform module 5, optionally a verification device 6, and optionally an external platform 7. The processing module 1 is coupled to the image-playing equipment 2, the physically-operated equipment 3, a platform database 4, optionally the platform module 5, optionally the verification device 6, and optionally the external platform 7, respectively.

The processing module 1 includes at least one processor, such as a Central Processing Unit (CPU) and/or a Graphic Processing Unit (GPU) commonly used in a computer or a server system. The processing module 1 is configured for receiving, transmitting, calculating and/or sending control instructions to the corresponding coupled unit. Units coupled with the processing module 1 includes the image-playing equipment 2, the physically-operated equipment 3, the platform database 4, and one or more of the platform module 5, the verification device 6 and the external platform 7.

The image-playing equipment 2 includes a monitor and is coupled with the processing module 1 to receive the control instruction to generate corresponding images, including at least one of a virtual character image, a scene image and a virtual object image. More specifically, the monitor is configured for generating 2-dimensional images or 3-dimensional images. Especially in an application of virtual reality, the monitor is configured for generating 3-dimensional images. It should be noted that the image-playing equipment 2 can be carried out by known technology and the detailed description is omitted here.

The physically-operated equipment 3 is coupled with the processing module 1 and is provided for users to input corresponding instructions or motions. Specifically, the processing module 1 receives the instruction or the motion, generates a corresponding instruction to control the image-playing equipment 2, and make at least one of the corresponding virtual character image, the corresponding scene image and the corresponding virtual object image changes correspondingly. For example, the physically-operated equipment 3 may include one or more information inputting units, such as a keyboard, a mouse, an audio input device (like a microphone as an input unit for verbal instructions) and a motion-detecting unit. The motion-detecting unit may be, for example, a sensing circuit using the gyroscope principle, to detect the change in the positions, directions, velocities and/or accelerations of the user. Optionally, the motion-detecting unit may further include a depth camera or an infrared sensor for obtaining the real-time detailed information of the postures of the users.

Particularly, the physically-operated equipment 3 may be, for example, head wear VR glasses that at least support Oculus/Meta Quest series, HTC Vive series or other VR glasses on the market. However, the present invention is not limited to the abovementioned VR glasses. Other VR glasses with different brands or different types (such as the Galaxy Gear series, the PlayStation VR series and the Apple Vision Pro series) may be included as well. Under these circumstances, the image-playing equipment 2 can be integrated with the physically-operated equipment 3. Optionally, the physically-operated equipment 3 may be a controller, such as a controller paired with the aforementioned VR glasses on the market, or a controller that may be used independently. Optionally, the physically-operated equipment 3 may be an image-detecting device and is configured for detecting the change of motions within a specific region (like the technology Nintendo applied in their game console Wii). Optionally, the physically-operated equipment can be equipped on the limbs or the body parts of the users to detect the change of postures of their body parts (including one or more fingers, palms, arms, feet, legs and so on). Noteworthily, the physically-operated equipment 3 can be carried out by known technology and the detailed description is omitted here.

The platform database 4 is coupled with the processing module 1, and is configured for providing all types of data for the basis of the images generated by the image-playing equipment 2. Particularly, the platform database 4 includes at least one of the following: a character database 41 (for providing information of characters), a scene database 42 (for providing information of different scenes), an object database 43 (for providing information of different objects), an audio and video database 44 (for providing audio and video information) and a graph and text database 45 (for providing graph and text information), such that the platform database may respectively provide the image-playing equipment 2 a corresponding virtual character image, a corresponding scene image, a corresponding object image, a corresponding information from the content of the video and/or audio, and a corresponding information from the content of the graph and/or text.

The character database 41 includes a plurality of pre-built character information. Different character information provides different appearance in the visual image (such as in height, slimness, face, outfit and their relative location), and may generate corresponding images of the virtual characters by the image-playing equipment 2.

The scene database 42 includes plural pre-built scene information, which may be understood as space information and includes detailed spatial shape, the dimension of the corresponding spatial shape (including length, width and height), color and the corresponding coordinate value, and may generate the corresponding scene image through the image-playing equipment 2. Preferably, a pre-built scene information similar to the reality may be generated through point cloud technology.

The object database 43 includes several pre-built object information. The object database 43 includes detailed shape of the object, the dimension corresponding to the object shape (including length, width and height), color and the corresponding coordinate value, and may generate images (especially 3D images of which the directions may be adjusted) of the corresponding virtual objects through the image-playing equipment 2, particularly for showing the virtual appearance of the corresponding object. The images (virtual object) generated by the object information include images that is corresponding to the living body or nonliving body in the real world, and customized object images (such as objects in a cartoon or an anime).

The audio and video database 44 includes pre-built video-only information (such as video files with no sound), audio only information and/or video and audio mixed information (such as typical video files with sound).

The graph and text database 45 includes pre-built text files or graph file. noteworthily, the platform database 4 can be carried out by known technology and the detailed description is omitted here.

Preferably, the platform database 4 may further include a user database 46 for storing personal associated data of a user. The user database 46 includes a verification information database 460, a preferred setting 461, and a personal association dataset 462. The verification information database 460 is configured for saving verify information when logging in the educational metaverse interactive platform EMIP for each user. The verify information includes accounts and passwords the users set or unique and recognizable biological information (such as fingerprint, iris or facial features), but is not limited in this regard. The preferred setting 461 is configured for saving a predetermined association information, which is for recording at least one of the character database 41, the scene database 42, the object database 43 and optionally the personal association dataset 462, for being used as a predetermined or preferred setting for an individual user. The personal association dataset 462 may be used for storing external personal character data or external personal object data exclusively owned by a specific user, both of which are loaded from an external user database 72 of an external platform 7. The external character data and object data are respectively virtual characters and virtual objects with external exclusivity that may be chosen and applied in the scene/virtual world in the educational metaverse interactive platform EMIP according to the present invention by users, which are different from the character data and the object data respectively built in the character database 41 and object database 43.

The "external exclusivity" indicates the ownership or right to use to an external personal associated data for a single user in the corresponding interactive platform, and may be understood as "binding" or "pairing" in the technical field of the present invention, especially to the unique association between data that is composed of digital messages and the sole data for recognition corresponding to real-life users. Particularly, in an optional condition, once an object data is bound or paired to an associated user, the bound/paired object can only be used or possessed by the associated user and cannot be transferred to or used by other users. In general, the external character data or external object data are virtual character and virtual object usually acquired only under a specific condition, as a symbol of the user's dedication or a symbol of the user having specific abilities, to bring sense of fulfillment or nostalgia to the users. Descriptions of the personal association dataset 462 loading the corresponding data from an external platform 7 will follow in this disclosure.

Optionally, the platform module 5 may be coupled with the processing module 1, and includes at least one of a log-in module A, a character module B and a scene module C. The log-in module A includes a window interface having at least two input boxes for the account and the password, respectively, for the users to type in their corresponding account and password through the physically-operated equipment 3 to complete/pass through the log-in procedure, and the window interface may be displayed by the image-playing equipment 2. Noteworthily, the window interface can be carried out by known technology and the detailed description is omitted here.

The character module B includes a character-selecting interface, which is coupled with the character database 41 directly or indirectly, and may display the plurality of pre-built virtual characters on the image-playing equipment 2, such that the user may select one of the plurality of pre-built virtual characters through the physically-operated equipment 3 to generate a virtual character that is being controlled by the user. Noteworthily, the character-selecting interface can be carried out by known technology and the detailed description is omitted here.

The scene module C is directly or indirectly coupled with the scene database 42 of the platform database 4, and may optionally be coupled with at least one of the character database 41, the object database 43, the audio and video database 44 and the graph and text database 45, to generate corresponding scene images. The scene images may be displayed independently through the image-playing equipment 2 or along with the virtual character of a user in the corresponding scene images. When the image-playing equipment 2 display the virtual character of a user in the corresponding scene, the processing module 1 would, according to the instruction or motion of the operation to the physically-operated equipment 3 by a user, make the virtual character in the corresponding scene image move synchronously or execute a predetermined function of the scene information. More specifically, in the process of making the virtual character move synchronously, the processing module 1 would calculate the change of the relations in terms of sizes or coordinates between the virtual character of a user and the scene image, so the image-playing module 2 may provide images for the users from the first person perspective. However, the visual effects provided is not limited to the first person perspective.

The educational metaverse interactive platform EMIP of the present invention, through the integration of the processing module 1, the image-playing module 2, the physically-operated equipment 3, the platform database 4 and the platform module 5, enable users to become the corresponding virtual character in a virtual world (the corresponding scene images), and make the virtual character move synchronously in the virtual world according to the instructions or motions of a user in the reality, thereby providing the effect of the combination of the reality and the virtual world. Particularly, when the applied scene information is generated by point cloud technology, the users in the virtual world may sense a scenery (scenes) in the reality as if having been to the exact location. Noteworthily, generating corresponding scene images and displaying virtual characters in the corresponding scene images can be carried out by known technology and the detailed description is omitted here.

The scene module C includes one or more of a communication scene C1, a lecture scene C2, a livestream scene C3, an activity scene C4 and a user scene C5. Each scene has a different interface arrangement and functions so the users are able to conduct diverse activities in different scenes, and would thus become more devoted in the atmosphere, activity, or incident of the current scene.

Figure 2:
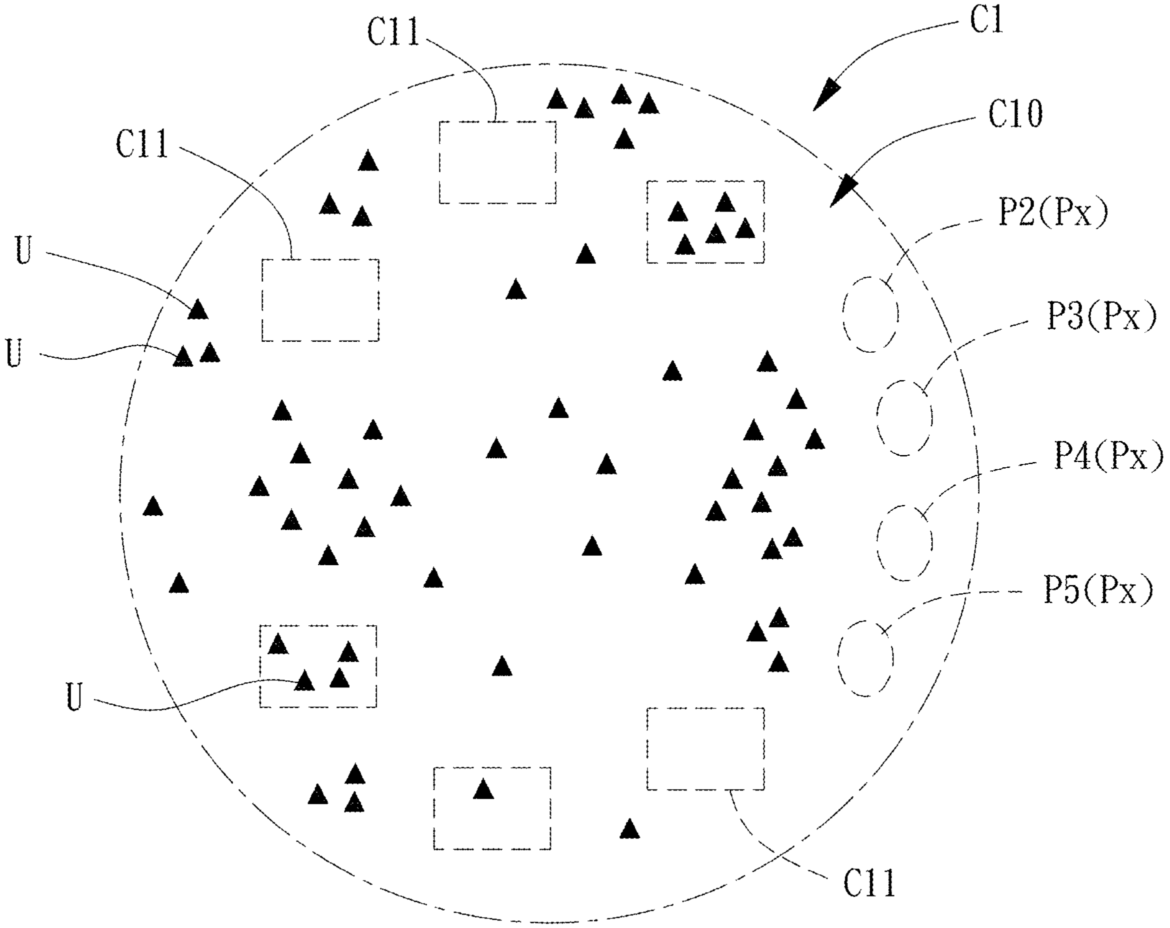
FIG. 2 is a schematic diagram showing the interface arrangement of the communicational scene according to the present invention.

FIG. 2 shows an example of the communication scene C1 being arranged under a two-dimensional structure (like a top view). The communication scene C1 is basically a public area C10 altogether; the triangular marks indicate virtual characters U of different users (locating in different locations of the public area C10); rectangular areas indicate the limited areas C11 in the public area C10. Oval areas indicate passages Px to different scenes. Noteworthily, the figures and areas with different shapes, quantities and positions are merely used for illustrating different features conveniently and making the content of the present invention more comprehensible, and the present invention is not limited thereto.

More specifically, the public area C10 of the communication scene C1 is provided for all users to have general interaction (like a square or a plaza in the reality), so the users may feel at ease and broad-minded. In other words, when a virtual character U of a user is in the public area C10, the information it transmitted (the audio messages it sent, the behavior, or the data it sent) are all public and accessible to other users. At least one limited area C11 is defined in the public area C10, and the virtual character U controlled by the users may basically enter and exit between the public area C10 and the limited area C11 freely. When a virtual character U of a user is in the limited area C11, the information it transmitted may only be received by the virtual characters of other users that is in the same limited area C11 at the same timepoint. Optionally, the user of the virtual character U that first enters the limited area C11 has the power of managing the limited area C11 and may select virtual characters of other users to enter/exclude virtual characters of other users from entering the limited areas C11. In this case, virtual character U of user who does not have the authorization may not enter and exit freely between the public area C10 and the unauthorized limited area C11.

Optionally, the public area C10 of the communication scene C1 has at least one passage Px. In the example shown in FIG. 2, the at least one passage Px includes a lecture scene passage P2, a livestream scene passage P3, an activity scene passage P4 and a user scene passage P5. The lecture scene passage P2, the livestream scene passage P3, the activity scene passage P4 and the user scene passage P5 are configured for sending/switching the users to a lecture scene C2, a livestream scene C3, an activity scene C4 and a user scene C5 respectively. For instance, when the user clicks on/selects the corresponding passage Px through the physically-operated equipment 3, or moves the corresponding virtual characters U and let the virtual character enter or go through the passage Px, the transmission will be activated. Similarly, the lecture scene C2, the livestream scene C3, the activity scene C4 and the user scene C5 may each include a communication scene passage P1 for users to be sent back to the communication scene C1.

Figure 3:
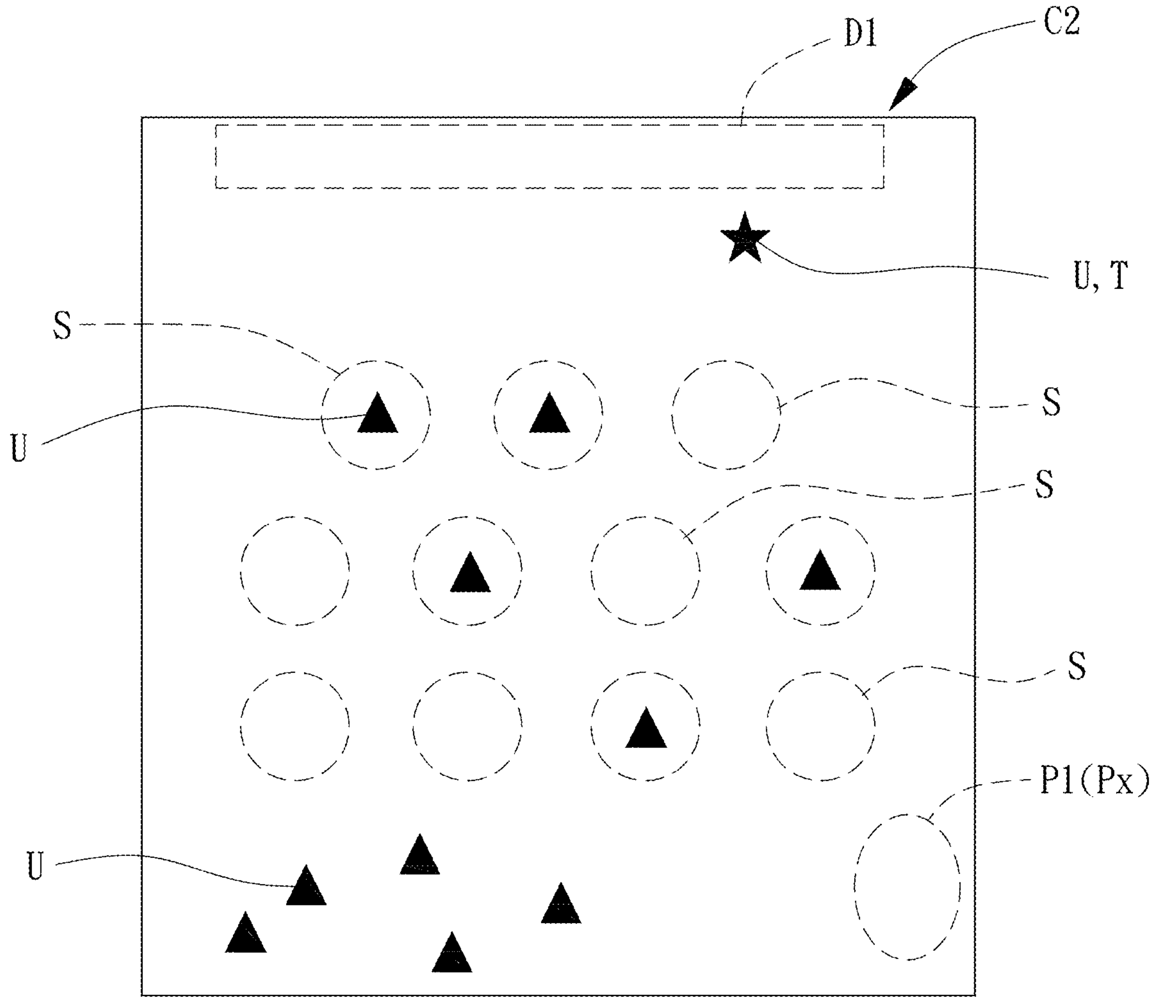
FIG. 3 is a schematic diagram showing the interface arrangement of the lecture scene according to the present invention.

FIG. 3 shows an example of the lecture scene C2 being arranged under a two-dimensional structure. In the lecture scene C2 in FIG. 3, the triangular marks indicate the position of the virtual characters U of different users; the star mark indicates the position of the virtual character U of a specific user as the lecturer T; the rectangular area indicates the lesson content displaying area D1; the circular areas indicate the seats S binding to the virtual characters U of users; the oval area indicates communication scene passage P1 for transmitting to the communication scene C1, which is also a type of the passage Px. Noteworthily, the figures and areas with different shapes, quantities and positions are merely used for illustrating different features conveniently and making the content of the present invention more comprehensible, and the present invention is not limited thereto.

The lecture scene C2 provides a scene particularly for users to learn and be lectured (like a classroom or a lecture hall in reality), so the users may concentrate and dedicate to learning. In addition, the lecture scene C2 also specifically grants the user of the lecturer T a right to guide the learning activity. The lesson content displaying area D1, set inside an area of the lecture scene C2, is configured for displaying materials for the lessons, such as object information, audio and video information (including audio and/or video data) or graph and text information (including graph and/or text data) that are required and may be loaded from the object database 43, the audio and video database 44, or the graph and text database 45.

Several areas in the lecture scene C2 are provided with seats S. When users click on/select the corresponding seat through the physically-operated equipment 3, or move the corresponding virtual character U to the corresponding seat S, the virtual character U and the seat S would form a temporary binding, making the position of the virtual character U fixed at the seat S until the temporary binding is relieved. Optionally, each seat S has corresponding virtual monitors (not shown) to display contents of the lessons in the lesson content displaying area D1 synchronously for the users.

Figure 4:
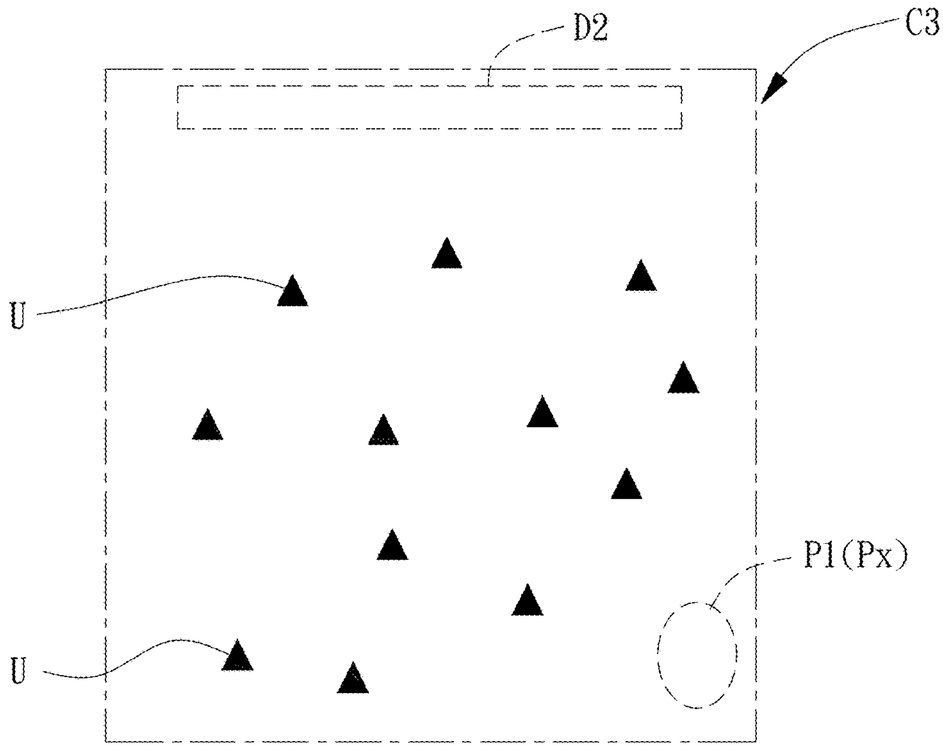
FIG. 4 is a schematic diagram showing the interface arrangement of the livestream scene according to the present invention.

FIG. 4 shows an example of the livestream scene C3 being arranged under a two-dimensional structure, to better illustrate the technical features of the livestream scene C3. In the livestream scene C3 in FIG. 4, the triangular marks indicate the positions of virtual characters U controlled by different users; the oval area indicates communication scene passage P1 to communication scene C1. Noteworthily, the figures and areas with different shapes, quantities and positions are merely used for illustrating different features conveniently and making the content of the present invention more comprehensible, and the present invention is not limited thereto.

The livestream scene C3 is a scene particularly provided for users to watch a livestream, especially a scene that enables multiple users to be in the same scene so the users may share their feelings and thoughts toward the content of the livestream immediately. The users may also give some feedbacks to the streamer immediately, which may optionally be reflected on the livestream as an interactive effect. An area of the livestream scene C3 is provided with a video displaying area D2, and the video displaying area D2 is configured for playing videos streamed on the internet (especially livestreams). In addition, in the livestream scene C3, the feedback from the virtual character U of the user, including voice messages or typed text messages, may be reflected on the video displaying area D2 in the text form to increase the diversity of the interactive mode (except for voice chat) and make the livestream more entertaining. The function of converting voice messages into text messages may be carried out by known technology and is thus be omitted in the present disclosure.

Figure 5:
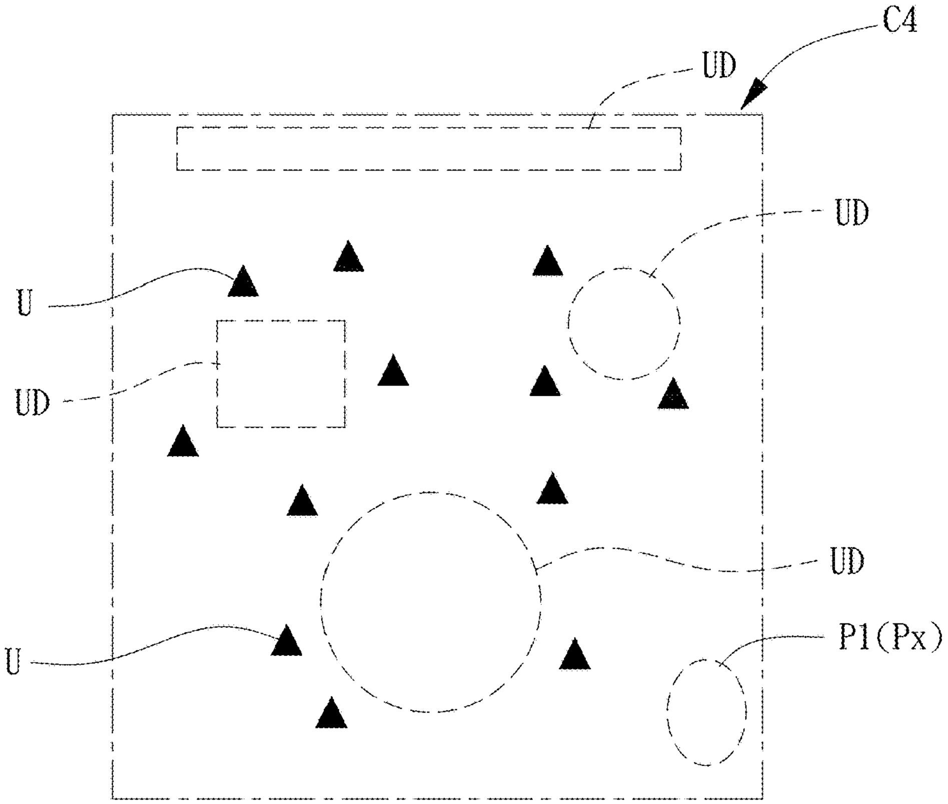
FIG. 5 is a schematic diagram showing the interface arrangement of the activity scene according to the present invention.

FIG. 5 shows an example of the activity scene C4 being arranged under a two-dimensional structure, to better illustrate the technical features of the activity scene C4. The activity scene C4 provides a scene particularly for users to conduct different theme activities (said theme activities are similar to hobbies, leisure activities, talents, or sports, such as jazz drum lectures/practices, watching movie, playing golf, yoga classes, etc.), especially that for multiple users to be in one scene, so that the user may interact with other users while doing activities, resulting in a positive sense of bonding. Since that the theme activities may vary a lot and be diverse, the activity scene C4 includes at least one user defined area UD (corresponding to the rectangular areas and circular areas in FIG. 5, while different areas with different sizes and shapes indicate the user defined area UD varies). The user defined area UD may be coupled with/connected to one or more of the object database 43, the audio and video database 44 and the graph and text database 45, to fulfill the theme activity of the activity scene C4 and install corresponding virtual objects.

Figure 6:
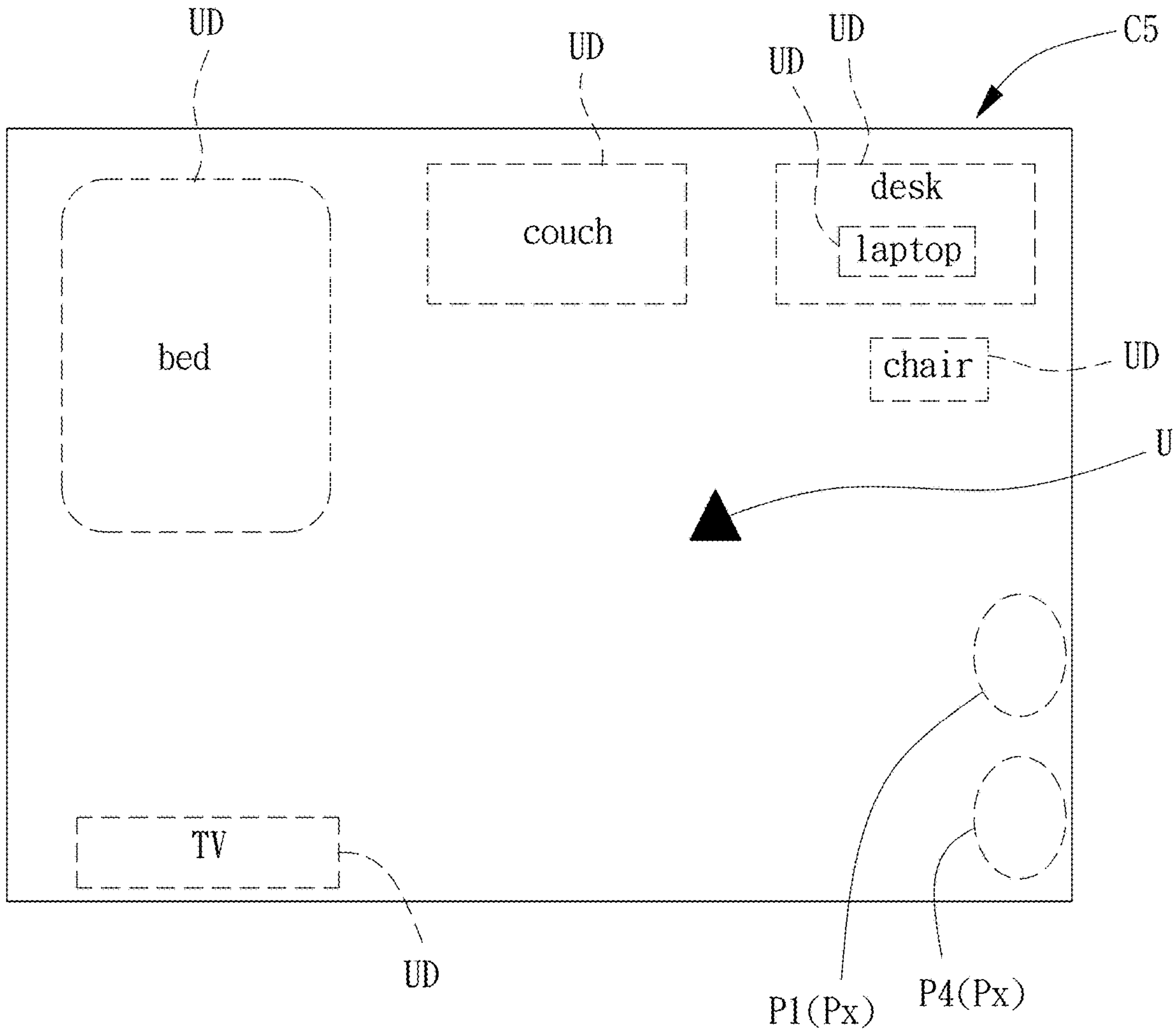
FIG. 6 is a schematic diagram showing the interface arrangement of the user scene according to the present invention.

FIG. 6 shows an example of the user scene C5 being arranged under a two-dimensional structure, to better illustrate the technical features of the user scene C5. The user scene C5 provides a scene particularly for users to manage their own ideal personal space with one or more of the scene information, object information, audio and video information or graph and text information loaded from the platform database 4 by the user to form at least one user defined area UD, especially the available scene information and the available object information. The user may optionally load in available virtual objects (corresponding to the objects with external exclusivity) from the external user database 72. In the user scene C5, the user defined areas, which are shown as the rectangular areas, indicate the available objects from the object database 43 or the objects with external exclusivity from the external user database 72, including virtual objects such as beds, televisions, couches, desks, laptops and chairs. Oval areas indicate passages Px to different scenes, and the types of passages may be chosen based on the user's preference. For example, in FIG. 6, the passages arranged are the communication scene passage P1 and the activity scene passage P4.

Noteworthily, in the example shown in FIG. 6, the arrangement may be saved in the preferred setting 461 by the corresponding user, so the next time when the user logs in the educational metaverse interactive platform EMIP of the present invention, the arrangement of the user scene C5 would be loaded automatically. More specifically, the predetermined associated information saved in the preferred setting 461 may also include the choice of at least one of the scene database 42, the object database 43 and optionally the personal association dataset 462 (as a default or preferred setting). Noteworthily, the figures and areas with different shapes, quantities and positions are merely used for illustrating different features conveniently and making the content of the present invention more comprehensible, and the present invention is not limited thereto.

Noteworthily, the fulfillment of the functions and techniques of the educational metaverse interactive platform EMIP of the present invention requires the user to control the virtual character of the user in the image-playing equipment 2 through the physically-operated equipment 3, and make the virtual character give lessons, make presentations, participate in classes, chat, discuss in a meeting, operate or watch all kinds of virtual objects, watch livestreams and take other actions that simulate behaviors in the reality, and may all be carried out by known technology. Specifically, switching scenes through passages Px, granting virtual objects, virtual scenes, and virtual character features different from those in the reality may also be carried out by known technology. Therefore, the fulfillment of the functions and techniques thereof is omitted here.

Noteworthily, one of the major contribution of the educational metaverse interactive platform EMIP of the present invention is the interface arrangement of the communication scene C1, including the public area C10 and the limited area C11 (as shown in FIG. 2), preferably with the limited area C11 surrounded by the public area C10. When the processing module 1 determines the virtual character U controlled by the user through the physically-operated equipment 3 is in the range of the limited area C11 or the public area C10, the image-playing equipment 2 corresponding to the user may only receive messages sent from corresponding virtual characters of other users in the respective same range. Particularly, when the virtual character U is at a different position, the confidentiality of the information sent differs accordingly. In other words, confidentiality in the public area C10 is lower (public and not restricted between specific people), while confidentiality in limited area C11 is higher (non-public and restricted between specific people). More specifically on the confidentiality, "public" means any user (whether in the same location or not) have access to the corresponding history of messages, while "non-public" means in general only users in the same location and at the same time may have access to the corresponding history of messages. Therefore, when two users need to communicate privately, they may move the corresponding virtual characters U from the public area C10 to the limited area C11. Thus, both public and non-public (privacy-guaranteed) real-time interaction can be achieved in the same scene.

More specifically, in the communication scene C1 including the public area C10 and the limited area C11, determination of whether a virtual character U has moved to a corresponding area or not depends on the determination by the processing module 1 on whether the coordinates of the virtual character U lie within the range of the borderline coordinates of the corresponding area. The coordinates of the virtual character U is controlled by the users through the physically-operated equipment 3, while the processing module 1 switches a specific area (the public area C10 and the limited area C11) of a specific scene (the communication scene C1) in a virtual world accordingly. By sending control signals to the image-playing equipment 2 to generate corresponding video and audio, motions of the users in the real world (generated by the physically-operated equipment 3) may be synchronized to the virtual world and the sensation in the virtual world (generated by the image-playing equipment 2) may also be reflected synchronously to the real world, achieving the effect of integrating the real world and the virtual world.

Please refer to FIG. 1 again, the educational metaverse interactive platform EMIP may further include a verification device 6. The verification device 6 is a biological signal detecting device configured for detecting recognizable biological information that differs from user to user (such as fingerprint, iris or face features) to validate the user's identity. The verification device 6 is coupled with the processing module 1 and the verification information database 460 for verifying the user's identity. More specifically, a user may have his or her biological information detected through the verification device 6, received and compared by the processing module 1 to determine whether the biological information is identical to the biological information in the verification information database 460. When the processing module 1 determines that they are identical (defined as "successfully verifies the user's identity"), the processing module 1 may send corresponding control instruction to corresponding elements or modules, to activate the corresponding elements or modules to generate functions of verification. The functions of verification include quick log-in, loading in default character, loading in default user scene and loading in data with external exclusivity, all of which will be illustrated below.

In the circumstance where the function of verification is quick log-in, the verification device 6, the processing module 1, the verification information database 460, the log-in module A are coupled directly or indirectly. When successfully verifies the user's identity, the log-in module A is triggered to activate the function of quick log-in, making the user complete/pass the log-in process of the log-in module A.

In the circumstance where the function of verification is loading in default character, the verification device 6, the processing module 1, the verification information database 460, the character module B and the preferred setting 461 are coupled directly or indirectly, and may additionally be coupled with the character database 41 or the personal association dataset 462. In addition, the object database 43 or the personal association dataset 462 may be coupled optionally. When successfully verifies the user's identity, the character module B is triggered to activate the function of loading in default character by loading in the predetermined association information saved in the preferred setting 461 to correspondingly link to the character database 41 or the personal association dataset 462 to load in the corresponding virtual character. Optionally, the virtual character may wear corresponding virtual objects. Therefore, the predetermined association information may also include the corresponding object information to correspondingly link to the object database 43 or the personal association dataset 462 to load in corresponding virtual objects, such that the loaded in virtual character may wear corresponding virtual objects.

In the circumstance where the function of verification is loading in default user scene, the verification device 6, the processing module 1, the verification information database 460, the scene module C, the scene database 42 and the preferred setting 461 are coupled directly or indirectly, and may additionally be coupled with the object database 43 or the personal association dataset 462. When successfully verifies the user's identity, the scene module C is triggered to activate the function of loading in default user's scene by loading in the predetermined association information saved in the preferred setting 461 to correspondingly link to at least one of the scene database 42, the object database 43, the audio and video database 44, the graph and text database 45 and optionally the personal association dataset 462 to load in the corresponding user scene C5.

In the circumstance where the function of verification is loading in data with external exclusivity, the educational metaverse interactive platform EMIP of the present invention is further coupled with an external platform 7. The external platform 7 has a corresponding external processing module 71 and the external user database 72. The external processing module 71 includes at least one processor and is coupled with the processing module 1. The external user database 72 is coupled with the external processing module 71 and further includes an external verification information set 720 and an external personal associated dataset 721. Similar to the verification information database 460, the external verification information set 720 has the verification information the user uses to log in the external platform 7 stored therein, especially the biological information of the respective users. The external processing module 71, the verification device 6 and the external user database 72 are coupled, such that the biological information of a user detected by the verification device 6 is received by the external processing module 71 and be determined whether it is identical to the biological information of the external verification information set 720 or not. When the external processing module 71 determines that they are identical (successfully verify the user's identity), the external processing module 71 may send control instructions to the corresponding elements or modules to execute corresponding functions, so the external personal associated data in the external personal associated dataset 721 may be sent and saved in the user database 46 (especially the personal association dataset 462) of the educational metaverse interactive platform EMIP.

Figure 7:
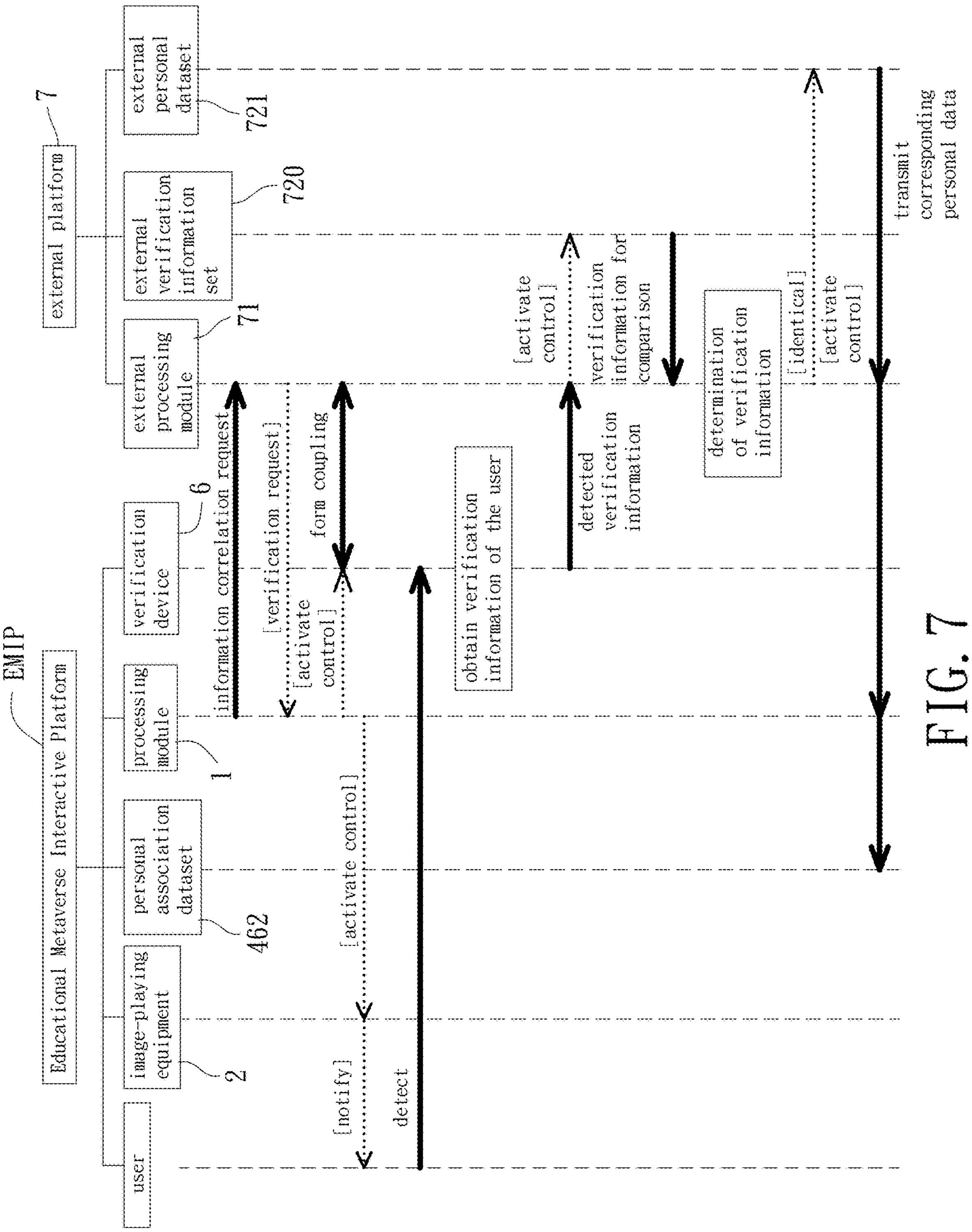
FIG. 7 is a schematic diagram of the collaborative operation relationship between elements when the educational metaverse interactive platform according to the present invention is loading personal associated data from the external platform.

More specifically, FIG. 7 is a schematic diagram depicting the coupling and the information correlation among the elements/modules for illustrating an example of loading the external personal associated data. In the example, the collaborative operation of the elements includes the contents below:

1. The processing module 1 of the educational metaverse interactive platform EMIP sends an information correlation request to the external processing module 71 of the external platform 7.
2. The external processing module 71 is coupled with the physical verification device 6 after receiving the information correlation request from the external processing module 71. More specifically, the external processing module 71 sends a verification request to the processing module 1 after receiving the information correlation request. The physical verification device 6 is coupled with the external processing module 71 to verify the user's identity after the processing module 1 receives the verification request. Preferably, the processing module 1 sends notification signals corresponding to the verification request to the user's image-playing equipment 2 to notify the user to verify his or her identity with the physical verification device 6.
3. The physical verification device 6 detects the biological information of the user (acquire "detected verification information") and sends the biological information to the external processing module 71. The external processing module 71 receives the biological information saved in the external verification information set 720 (acquire "verification information for comparison") to determine whether the detected verification information is identical to the verification information for comparison by the external processing module 71.
4. When the external processing module 71 determines the detected verification information and the verification information for comparison are identical, the personal association dataset 462 receives and saves the external personal associated data (external personal character data or external personal object data) of the external personal associated dataset 721 corresponding to the user. Noteworthily, formats of character data or object data may vary from different platforms. Thus, during the process of sending the external personal associated data from the external processing module 71 to the processing module 1 or the process of sending the external personal associated data from the processing module 1 to the personal association dataset 462, the external personal associated data may be converted into converted personal associated data with a format compatible to the educational metaverse interactive platform EMIP according to an information converting agreement between the two platforms (the educational metaverse interactive platform EMIP and the external platform 7).

In an example of application (illustrative but not restrictive of the present invention), the external platform 7 may be a specific game platform. Users may acquire limited personal virtual objects or virtual characters (costumes) from the game platform under a certain condition and. In addition, through the collaborative operation of the elements including the educational metaverse interactive platform EMIP, the verification device 6 and the external platform 7, the personal virtual objects or virtual characters acquired from outside of the educational metaverse interactive platform EMIP may be loaded into the educational metaverse interactive platform EMIP for use therein.

Noteworthily, the verification information obtained through the verifying device 6 is preferably biological information of fingerprints or iris to ensure the effect of proving the identity of the user with high specificity. However, the verification information is not limited in this regard, and may include all verification means available in the current and future technology. For example, the verification information may be a facial feature of a user (facial recognition technology). The verification information may also be a verification code. In an example of application, such as an online transaction can be used, when the user demands the credit card system (compared to the external platform 7) to pay (compared to obtaining external personal associated data), the credit card system is activated to demand the user to send a verification code (compared to the verification information) through a cellphone (compared to the verification device 6) so the credit card system is authorized to proceed with the payment. The verification information may also be the user ID and the password.

Optionally, in various scenes of the educational metaverse interactive platform EMIP, corresponding management authorizations can be granted to specific users ("scene manager") to perform corresponding management functions in various scenes and manage other users ("managed user") in the respective scenes. The management functions include at least one of group association, position association, permission management and status determination. The group association is used for designating groups among the managed users. The position association is used for designating specific coordinates in corresponding scenes where the managed users move to. The permission management is used for controlling the controllability of specific abilities of the managed users in corresponding scenes, especially for voice control. The status determination is used for determining states of interest of the managed users, especially for determining sequence of actions.

The group association: In the learning process, using grouping methods is a common practice, but some students may have difficulty finding group members due to various factors. Therefore, the scene managers can be granted with corresponding group association functions to facilitate teaching. In the group association function, the scene manager can adjust the group association to group unassigned managed users according to a specific method. The specific method can be random assignment, average assignment based on specific attributes, or extreme assignment based on specific attributes. The specific attributes can be one or more of height, weight, grade, gender, platform usage time, and are not limited to these. Through extreme assignment based on specific attributes, groups with higher attributes can be screened out to participate in external competitions. Particularly, when some managed users have already selected groups, the member composition of the selected groups can be maintained, and unassigned managed users can be added to one of the existing selected groups. For example, in this situation, the scene manager can click a virtual button such as "One-Click Grouping" in the display interface to execute the corresponding function.

The position association: In the learning process, if some managed users can move freely in the corresponding scenes, other managed users may be affected or distracted. Therefore, the scene managers can be granted with corresponding position association functions to facilitate teaching. The specific contents of the position association function are illustrated as follows:

1. Associating a managed user's virtual character U with an unassociated seat S, making the designated managed user's virtual character U move to the associated seat S. For example, in this situation, the scene manager can click a virtual button such as "Assign Seat" in the display interface to execute the corresponding function.
2. Optionally, all managed users can be assigned to corresponding seats S. For example, in this situation, the scene manager can click a virtual button such as "One-Click Seating" in the display interface to execute the corresponding function.
3. Optionally, when managed users are already grouped, they can be assigned to seats S according to their grouping, making seats S of managed users in the same group adjacent to each other. For example, in this situation, the scene manager can click a virtual button such as "Assign Seats by Group" in the display interface to execute the corresponding function.
4. Optionally, managed users who have been associated with seats S through the above operations will have their movement ability temporarily disabled in the lecture scene C2.

Voice control in the permission management: In the learning process, if the managed users can speak freely in the corresponding scenes, the managed users may be affected or distracted. Therefore, the scene managers can be granted with corresponding voice control functions to facilitate teaching. The specific contents of the voice control function are illustrated as follows:

1. Enabling or disabling voice function for at least one of the managed users. When the voice function is enabled, the managed users can emit sounds in the scene, namely, voice will be transmitted in the scene. When the voice function is disabled, the managed users cannot emit sounds in the scene, namely, voice will be muted in the scene. For example, in this situation, the scene manager can click virtual buttons such as "Designate Speaking" (enable the voice function) and "Designate Mute" (disable the voice function) in the display interface to execute the corresponding functions.
2. Optionally, the voice function of all managed users can be designated to be enabled or disabled. For example, in this case, the scene manager can click a virtual button such as "One-click Speaking" (enable the voice function) and "One-click Mute" (disable the voice function) in the display interface to execute the corresponding function.

Determining sequence of actions in the status determination: In the learning process, for teaching purposes, the scene manager can invite managed users to complete a specific action and grant a specific authorization to the first-to-complete managed user. Taking question-answering activity as an example, the authorization for answering a specific question can be obtained by the first managed user who raises the hand or presses an answer button. Particularly, the corresponding voice function is disabled until the specific managed user obtains the authorization to answer. In particular, it is not easy to identify which user raises the hand first, so the scene manager can be provided with a corresponding function of determining sequences of actions, so as to facilitate the teaching.

In determining sequence of actions, the scene manager can click a virtual button such as "Race" in the display interface, and then the time of each managed user completing the corresponding action can be recorded and sorted, such that the scene manager can select the managed user who completed the specific action first to answer the current question. In particular, the scene manager can have other managed users who completed the specific action later to supplement the answer, so as to improve the users' critical thinking ability by having opinions from users of various point of views.

In the "Race" example, the "time of completing the corresponding action" is defined as:

1. In an example of hand-raising: The educational metaverse interactive platform EMIP determines whether the managed user raises the hand until up-right only after the scene manager triggers the specific function, and records the corresponding time of completing.
2. In an example of bell-ringing: The educational metaverse interactive platform EMIP records the corresponding time of answer bells being pressed by each managed user after the scene manager triggers the specific function.

It should be noted that although the various management functions performed by the scene managers are used for managing users, the management functions may also be used for managing various objects.

Figure 8:
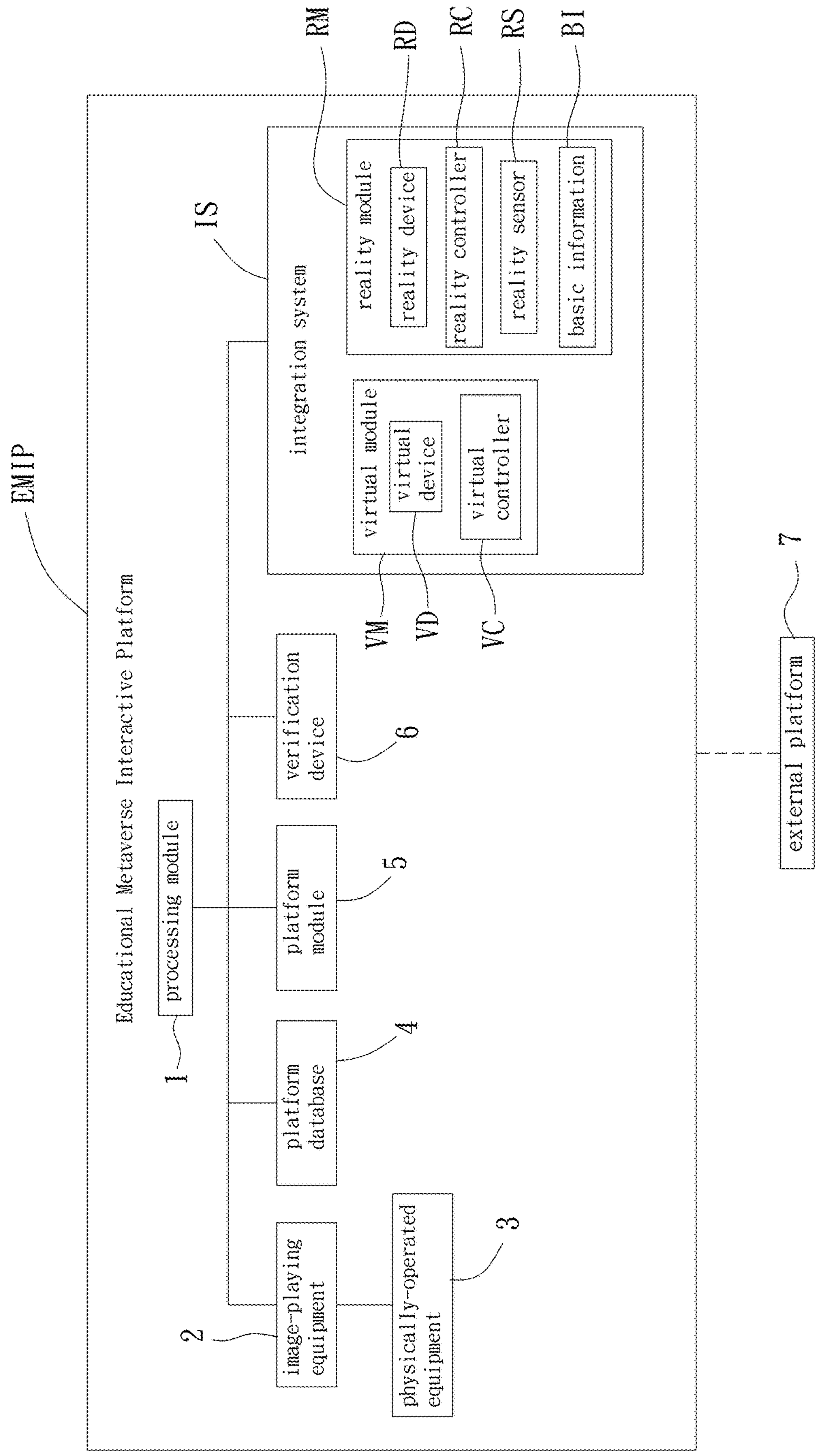
FIG. 8 is a block diagram showing a preferred embodiment of the educational metaverse interactive platform according to the present invention, further including an integration system.

Please refer to FIG. 8, which shows another preferred embodiment of an educational metaverse interactive platform EMIP of the present invention, and may further include a virtual-reality integration system IS coupled to the processing module 1, and further coupled to any of the image-playing equipment 2, the physically-operated equipment 3, the platform database 4, the platform module 5, and the verification device 6. The integration system IS includes a reality module RM and a virtual module VM coupled to the reality module RM.

The reality module RM includes a reality device RD, a reality controller RC, optionally a reality sensor RS and optionally basic information BI. The reality device RD can be any device in the reality. The reality controller RC is coupled to the reality device RD for controlling/driving the reality device RD. In particular, in the case that only the reality controller RC and the reality device RD are provided, a user can directly input corresponding information or perform corresponding action to the reality controller RC in reality to control the action of the reality device RD. When there are a virtual controller VC, the reality controller RC and the reality device RD, a user can directly generate a corresponding operation input signal in the virtual scene by operating or inputting to the virtual controller VC, and the reality controller RC controls the action of the reality device RD according to the operation input signal. The reality sensor RS can be arranged in at least one of the reality controller RC, the reality device RD and an actual environment to detect information of interest of the reality controller RC, the reality device RD or the actual environment. The basic information BI records requirement information and/or limitation information in the actual environment in which the reality device RD applies. The requirement information is resource information required by the reality device RD for performing one-time operation and can be used for calculating a limit value of an operable value. The limitation information is information that the reality device RD must not exceed during operation, and can be used for calculating a limit value of an operable value.

The virtual module VM is coupled to the reality module RM and includes a virtual controller VC and optionally a virtual device VD. The virtual controller VC is coupled to the physically-operated equipment 3, the reality controller RC, and the reality sensor RS. The operation or input of the physically-operated equipment 3 and the operation or input of the virtual controller VC have a specific relationship to generate a corresponding operation input signal, and the reality controller RC receives the operation input signal and controls the reality device RD to operate. Optionally, the processing module 1 or the virtual controller VC is coupled to the reality sensor RS and can obtain information of interest of the reality controller RC, the reality device RD or the actual environment. Preferably, the processing module 1 or the virtual controller VC can further receive the basic information BI, so as to calculate a limit value of an operable value corresponding to the reality device RD through a relationship between the information of interest and the basic information BI, such that the user can input a corresponding operation input signal within the range of the limit value of the operable value.

Particularly, the information of interest may have a conversion relationship with the operable value of the reality device RD in numerical units. Multiplying the information of interest by this conversion relationship yields a current state value. When the processing module 1 determines that the current state value meets the requirement information or does not exceed the limitation information, it can calculate a limit value of an operable value through the relationship between the current state value and the requirement/limitation information. This limit value information is displayed on the operation interface of the virtual controller VC, allowing users to input corresponding operation input signals within the range of the limit value. Additionally, when the processing module 1 determines that the converted current state value does not meet the requirement information or exceeds the limitation information, it disables the function for users to input operation input signals and preferably displays an inoperable reminder message on the operation interface, such as "Current resources do not meet minimum required resources, cannot execute" or "Current value exceeds maximum limitation, cannot execute".

Optionally, when the virtual controller VC cannot couple with the reality controller RC, the inoperable reminder message may be "Unable to connect to corresponding reality device". Optionally, when the reality device RD is damaged, the message may be "Reality device is damaged".

Specifically, after a user inputs corresponding operation input signals, the virtual controller VC controls the reality controller RC to control the reality device RD's operation according to these signals. The virtual controller VC calculates the difference between the corresponding value in the operation input signal and the limit value of the operable value, and updates the limit value with this difference. For example, if the limit value before updating is 100 units and the corresponding value in the operation input signal is 30 units, the updated limit value would be 70 units. Optionally, when the difference becomes zero, the virtual controller VC displays an inoperable reminder message on the operation interface.

Optionally, the virtual device VD has a virtual appearance corresponding to the reality device RD. Specifically, the virtual device VD couples with the object database 43 to load the virtual appearance corresponding to the reality device RD. Thus, in the virtual scene generated by the image-playing equipment 2, a virtual device VD similar to the reality device RD can be presented, allowing users to operate the reality device RD in reality and the virtual device VD in the virtual scene through their virtual characters' input to the virtual controller VC.

In an implementation A of virtual-reality integration application, a virtual operation realizes a real action, and does not involve signal of interest and the basic information BI. In the implementation A, the integration system IS can include only the reality device RD, the reality controller RC, the virtual controller VC and optionally the virtual device VD.

In an example corresponding to the implementation A, such as controlling the light to be turned on or off, the virtual controller VC presents a virtual object such as a switch (defined as a virtual switch). When the user turns on the virtual switch in the corresponding virtual scene through the physically-operated equipment 3, the virtual controller VC sends a corresponding operation input signal to the corresponding reality controller RC, and control, through the reality controller RC, the reality device RD to simulate a power-receiving state to operate. In an example that the reality device RD is a lamp, the corresponding lamp emits light.

In another example corresponding to the implementation A, such as the reality device RD in which an object that generates and supplies power to the actual environment by spinning, the virtual controller VC couples with the physically-operated equipment 3 and presents the corresponding virtual object in the corresponding scene, such as a wheel having a handle. The user can operate the physically-operated equipment 3 to simulate holding the handle of the wheel and spinning in the virtual scene. The virtual controller sends a corresponding operation input signal to the corresponding reality controller RC and control, through the reality controller RC, the reality device RD to simulate the power-receiving state and operate. In an example that the reality device RD is a lamp, the corresponding lamp emits light.

Optionally, when the corresponding virtual device RD is provided, the virtual device RD presents a lamp and presents a light-emitting image in the virtual scene when the virtual controller VC sends the corresponding operation input signal.

In an implementation B of virtual-reality integration application, a virtual operation realizes a real action, and the virtual scene changes according to the signal of interest in the actual environment. In the implementation B, the integration system IS can include the reality device RD, the reality controller RC, the reality sensor RS, the virtual controller VC and optionally the virtual device VD.

Based on the contents in the implementation A, the implementation B further includes the reality sensor RS. The reality sensor RS detects whether the reality device RD is operated or the state of operation to generate corresponding information of interest. The processing module 1 or the virtual controller VC receives the information of interest to control the image in the virtual scene to change according to the information of interest. Specifically, the virtual module further includes the virtual device VD which changes the image in the virtual scene according to the information of interest.

In an example of simulating a lamp to be turned on or off, the corresponding reality sensor RS is a light sensor. The information of interest is an information whether the light of the reality device RD is turned on or the light intensity, so that the brightness of the corresponding virtual scene is positively correlated to the information of interest. In particular, when the virtual module VM further includes the virtual device VD such as a lamp, the virtual device VD presents a state of lamp corresponding to the reality device RD according to the information of interest.

In an example of simulating vehicle-driving, the virtual controller VC is coupled with the physically-operated equipment 3 and presents the corresponding virtual object in the corresponding scene, such as a steering wheel, an accelerator or a brake. The user can simulate operating the steering wheel, the accelerator or the brake in the virtual scene through operating the physically-operated equipment 3. The virtual controller VC sends corresponding operation input signal to the corresponding reality controller RC, and control, through the reality controller RC, the reality device RD to simulate receiving the corresponding operation input signal and operate. In an example that the reality device RD is a vehicle, which can be a real vehicle or a physical model vehicle, the corresponding vehicle can be operated. Specifically, the physical model vehicle includes a remote control car and is disposed in an actual simulation area. The corresponding reality sensor RS is an image capture unit and the information of interest is an image from at least one perspective of the reality device RD, especially the perspective of moving direction of the operated physical vehicle. The information of interest is presented in the corresponding virtual scene simultaneously to present an image of the perspective of the moving direction when simulating driving the vehicle. Specifically, the information of interest is sent to the processing module 1 and the processing module 1 controls the image-playing equipment 2 to present the information of interest.

In an implementation C of virtual-reality integration application, a virtual operation realizes a real action, the virtual scene changes according to the signal of interest in the actual environment, and the physically-operated equipment 3 generates a corresponding operation according to another information of interest in the actual environment. Specifically, compared to the implementation B, the implementation C further includes another reality sensor RS. The another reality sensor RS detects another state of the reality device RD to generate another information of interest. The processing module 1 or the virtual controller VC receives the another information of interest and controls the physical-operated equipment 3 to generate a corresponding operation according the another information of interest. According to the above-mentioned vehicle-driving example, the another reality sensor RS is disposed on the reality device RD to detect a vibration signal of the corresponding vehicle during driving. The processing module 1 receives the vibration signal of the signal of interest and controls the physically-operated equipment to generate a corresponding vibration. Specifically, the physically-operated equipment 3 has a corresponding vibration motor that can generate a corresponding vibration.

In an implementation D of virtual-reality integration application, the operation input signal generated by the user is limited within a range of a limit value of an operable value, and the limit value of the operable value is dependent on corresponding information of interest and basic information BI. Specifically, in the implementation D, the integration system IS can include the reality device RD, the reality controller RC, the reality sensor RS, the basic information BI, the virtual controller VC and optionally the virtual device VD. The virtual controller presents a display interface. The display interface allows the user to input operation input information within the range of the limit value of the operable value calculated based on the information of interest and the basic information BI detected by the reality sensor RS.

Taking a pattern where the limit value of the operable value is calculated from single information of interest and single basic information BI as an example, such as in a plant irrigation application, particularly applicable to plant/crop irrigation, the corresponding scene image can present a virtual environment image corresponding to the current real image of the plant. In the corresponding reality module RM, the corresponding reality device RD can be an irrigation device, such as a sprinkler, spraying vehicle, or other watering device. The corresponding reality controller RC controls the operation of the reality device RD. The corresponding reality sensor RS is a soil moisture sensor for detecting the current soil moisture (particularly volumetric water content) as the information of interest. The corresponding basic information BI is the water requirement of the plant, specifically defined as the limitation information based on the optimal or limit water value needed during the target plant's growth process. In the corresponding virtual module VM, the corresponding virtual device VD presents an object image like the reality device RD in the virtual environment image. The corresponding virtual controller VC couples with the reality controller RC.

Based on the above mentioned configuration, when a user triggers the virtual controller VC, the virtual controller VC displays either a corresponding limit value of an operable value (calculated by the current value information converted from subtracting the information of interest from the limitation information, for example, the calculated result is the maximum irrigable water volume in the current state) or an inoperable reminder message. Particularly, the inoperable reminder message can be “Soil moisture upper limit reached”. When the virtual controller VC displays the limit value of the operable value, users can input corresponding operation input signals within the range not exceeding the limit value, making the virtual controller VC control the reality controller RC to control the operation of the reality device RD. In this case, the virtual device VD may optionally generate corresponding operation (watering) images. Particularly, the limit value of the operable value is calculated by the converted water volume (current value information) obtained by subtracting the current soil moisture (information of interest) from the limitation information, in which the converted water volume can be calculated by the soil volume and the current soil moisture.

Similarly, taking a pattern where the limit value of the operable value is calculated from single information of interest and single basic information BI as an example, such as in an air conditioner controlling application, an object image of the virtual device VD with an air conditioner appearance can be presented in any scene image. In the corresponding reality module RD, the corresponding reality device RD can be a device for implementing environmental temperature control, such as an air conditioner. The reality controller RD controls the operation of the reality device RD. The reality sensor RS can detect corresponding information of interest, including the current target temperature and/or an environmental temperature of the reality device RD. Particularly, the target temperature is the default set temperature when turning on the air conditioner, the set temperature after the latest operation or the current input set temperature. The corresponding basic information BI includes the adjustable temperature range of the air conditioner. In the corresponding virtual module VM, the corresponding virtual device presents an object image like the reality device RD in the virtual environment image. The corresponding virtual controller VC couples with the reality controller RC. Preferably, in addition to the temperature control, the user can select other functions (such as dehumidification or fan mode) of the reality controller RC in the virtual controller VC through the coupling relationship of the virtual controller VC and the reality controller RC.

According to the above configuration, when the user triggers the virtual controller VC, it displays the current environmental temperature and various functions of the air conditioner (e.g., cooling, dehumidification, or fan mode). When the user selects the cooling function, the virtual controller VC additionally displays either the corresponding limit value of the operable value or an inoperable reminder message. Specifically, the limit value of the operable value has an operation upper limit and an operation lower limit, with the operation upper limit defined by subtracting the current target temperature from an upper limit of the temperature range in the basic information BI, and with the operation lower limit defined by subtracting a lower limit of the temperature range in the basic information from the current target temperature. For example, when the target temperature is 26 degrees Celsius (the interested information), and the upper limit and the lower limit of the temperature range which can be adjusted by the air conditioner are respectively 32 degrees Celsius and 16 degrees Celsius (the limitation information in the basic information BI), the operation upper limit in the corresponding limit value of the operable value is (plus) 6 degrees Celsius and the operation lower limit is (minus) 10 degrees Celsius. When the virtual controller VC displays the limit value (the operation upper limit and the operation lower limit) of the operable value, a user can input a corresponding operation input signal within the range of the limit value not exceeding the operable value, so that the virtual controller VC controls the reality controller RC to control the reality device RD to operate. In this case, the virtual device VD optionally generates a corresponding operation (the operation of the air conditioner) image.

Taking a pattern where the limit value of the operable value is calculated from multiple information of interest and multiple basic information BI as an example, such as in a coffee-brewing application, an object image of the virtual device VD with a coffee machine appearance can be presented in any scene image. In the corresponding reality module RM, the corresponding reality device RD may be a device for brewing coffee, such as a coffee machine. In particular, the device can be used for brewing various coffee beverages (such as americano, espresso, latte, cappuccino, macchiato, etc.) but is not limited thereto. A corresponding reality controller RC controls the operation of the reality device RD. The corresponding plurality of reality sensors RS can be respectively used for detecting corresponding interest information, including the content of coffee beans, the capacity of coffee grounds and the water amount in the water tank. Particularly, for the coffee machine capable of brewing various coffee beverages, the corresponding reality sensor RS is further provided to detect the content of milk. The corresponding basic information BI respectively includes the content of coffee beans required by brewing various coffee (belonging to requirement information), a threshold value of the capacity of coffee grounds (belonging to limitation information), the capacity of brewing various coffee to generate coffee grounds and the water quantity required for brewing various coffee (belonging to requirement information). In particular, for a coffee machine capable of brewing various coffee beverages, the corresponding basic information BI further includes the content of milk required by various coffee (belonging to requirement information). In the corresponding virtual module VM, the corresponding virtual device VD presents an object image of the reality device RD in the virtual environment image. The corresponding virtual controller VC is coupled with the reality controller RC.

According to the above configuration, when the user triggers the virtual controller VC, the virtual controller VC displays either a corresponding limit value of an operable value (calculated from each of the information of interest and the basic information BI, and the calculated result is such as the number of cups of various types of coffee that can be brewed) or an inoperable reminder message. In particular, the inoperable reminder message can be “insufficient coffee beans”, “full coffee grounds”, “insufficient water” or “insufficient milk”. When the virtual controller VC displays the limit value of the operable value, a user can input a corresponding operation input signal within a range not exceeding the limit value of the operable value, so that the virtual controller VC controls the reality controller RC to control the reality device RD to operate. In this case, the virtual device VD optionally generates a corresponding operation (brewing coffee) image.

In particular, the limit value of the operable value is calculated considering the relationship among the following information of interest and the basic information BI. For example, taking brewing americano as an example, dividing the current content of coffee beans (interest information) by the content of coffee beans required for brewing the corresponding coffee (requirement information in the basic information BI) yields a first ratio (considering the brewable amount in terms of coffee beans). Subtracting the current capacity of coffee grounds from the threshold value of the capacity of coffee grounds yields a capacity difference value, dividing the capacity difference value by the capacity of coffee grounds generated by brewing corresponding coffee (requirement information in the basic information BI), yielding a second ratio (considering the brewable amount in terms of the coffee grounds). By dividing the current water volume (information of interest) of the water tank by the volume of water required for brewing the corresponding coffee (requirement information in the basic information BI), a third ratio can be calculated (considering the brewable amount in terms of the water volume). The corresponding limit value of the operable value (the maximum number of cups of americano that can be brewed) can be calculated by rounding down the minimum of the first, second and third ratios).

Optionally, considering brewing milk-containing beverage, dividing the current content of milk (information of interest) by the content of milk required for brewing the corresponding coffee (requirement information in the basic information BI) yields a fourth ratio (considering the brewable amount in terms of milk). The minimum of the first to fourth ratios can be rounded down to obtain a corresponding limit value of the operable value (namely, the maximum number of cups of milk-containing coffee that can be brewed).

It should be noted that when any of the first to fourth ratios is less than 1, it means that the corresponding beverage cannot be made due to lack of corresponding resources. In this case, the inoperable reminder message such as "insufficient coffee beans", "full coffee grounds", "insufficient water" or "insufficient milk" can be displayed on the operation interface.

Based on the relationship among the multiple information of interest, the multiple basic information BI and the limit values of the operable values, it can be understood that there is a plurality of reality sensors RS to correspondingly detect multiple interest information. Each information of interest and a corresponding one of the multiple basic information BI can be calculated to obtain a ratio. Each ratio represents a limit value, and the limit value of the operable value is a minimum limit value of a range defined by the intersection of each limit value. When the minimum limit value is rounded down to be less than 1, the virtual controller VC displays an inoperable reminder message on the operation interface.

Based on the above, through the collaborative operation of the verification device, the interactive platform and the external platform, the educational metaverse interactive platform of the present application allows users to use their personal objects obtained from other external platforms in this interactive platform. Therefore, the educational metaverse interactive platform not only enables multiple users to interact but also achieves interaction and data connection with other external platforms. Additionally, by configuring at least one limited area within the public area through interface arrangement in the communication scene, users are allowed to enter the range of the limited area from the public area when private communications (such as expressing opinions or transmitting information) are required, realizing fast conversion between the respective functions of public and non-public communications. Furthermore, by granting management authorization to the scene manager, the status of managed users can be adjusted, enabling various activities, especially teaching activities, to proceed smoothly. Moreover, through the configuration of the virtual-reality integration system, controls performed in the virtual scene can lead to the operation of corresponding reality devices in the real world. Additionally, through the relationship between the information of interest and the basic information, the limit value of the operable value for the reality device can be calculated. Finally, through calculating the difference between corresponding values in operation input signals and the limit value of the operable value, the virtual controller can update the limit value of the operable value.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. An educational metaverse interactive platform, comprising:

a processing module including at least a processor;

an image-playing equipment coupled with the processing module to receive a control instruction from the processing module and generate a corresponding image;

a platform database coupled with the processing module and including a character database, a scene database and an object database, respectively for providing character information, scene information and object information for the image-playing equipment to respectively generate a virtual character image, a scene image and a virtual object image, wherein the platform database further includes a user database for storing personal associated data of a user;

a physically-operated equipment coupled to the processing module for the user to input an instruction or action, wherein the processing module receives the instructions or action and generates a control instruction to control the image-playing equipment, making at least one of the virtual character image, the scene image and the virtual object image to change correspondingly;

a verification device for detecting biological information of each user; and an external platform including:

an external processing module; and an external user database comprising:

an external verification information set storing verification information for each user to log into the external platform, wherein the verification information includes the biological information of each user; and an external personal associated dataset including external personal associated data of each user;

wherein the external processing module, the verification device, the external user database and the user database are coupled with each other, when the user has the biological information detected through the verification device, the external processing module receives and determines whether the biological information detected by the verification device and the biological information in the external verification information set are identical; wherein when the biological information detected by the verification device and the biological information in the external verification information set are identical, the external processing module sends a corresponding control instruction to transmit the external personal associated data of the user from the external personal associated dataset to the user database of the educational metaverse interactive platform for storage.

2. The educational metaverse interactive platform as claimed in claim 1, further comprising a platform module coupled with the processing module; wherein the platform module includes a log-in module for the user to verify the identity to complete log-in procedure of the interactive platform; wherein the user database includes a verification information database storing verification information for each user to log into the interactive platform, and the verification information includes the biological information of each user; wherein the verification device, the processing module, the verifying information database and the log-in module are coupled with each other, when the user has the biological information detected by the verification device, the processing module receives and determines whether the biological information detected by the verification device is identical to the biological information in the verifying information database; wherein when the processing module determines the biological information detected by the verification device and the biological information in the verifying information database are identical, the processing module sends a corresponding control instruction to the log-in module to activate the log-in module to complete the log-in procedure of the user.

3. The educational metaverse interactive platform as claimed in claim 1, further comprising platform module coupled with the processing module; wherein the platform module includes a character module coupled with the character database to display multiple prebuilt virtual characters through the image-playing equipment for the user to select; wherein the user database has a verifying information database and a preferred setting, wherein the verifying information database saves verification information of each user for logging in the educational metaverse interactive platform, and the verification information includes the biological information of the user; wherein the preferred setting saves a predetermined association information, which records the choices of each user from the character database; wherein the verification device, the processing module, the verifying information database, the character module and the preferred setting are coupled with each other, when the user has the biological information detected by the verification device, the processing module receives and determines whether the biological information detected by the verification device is identical to the biological information in the verifying information database; wherein when the processing module determines the biological information detected by the verification device and the biological information in the verifying information database are identical, the processing module sends a corresponding control instruction to the character module to load in the predetermined association information saved in the preferred setting, to correspondingly link to the character database to load in a corresponding virtual character.

4. The educational metaverse interactive platform as claimed in claim 1, further comprising a platform module coupled with the processing module, wherein the platform module includes a scene module, the scene module is coupled with the platform database to generate corresponding scene image; wherein the scene module further includes a user scene providing each user a corresponding personal space for the user to select one or more of corresponding scene information and object information from the platform database; wherein the user database having a verifying information database and a preferred setting, wherein the verifying information database saves verification information of each user for logging in the educational metaverse interactive platform, and the verification information includes the biological information of the user; wherein the preferred setting saves a predetermined association information, which records the choices of each user from the corresponding user scene; wherein the verification device, the processing module, the verifying information database, the scene module, the platform database and the preferred setting are coupled with each other, when the user has the biological information detected by the verification device, the processing module receives and determines whether the biological information detected by the verification device is identical to the biological information in the verifying information database; wherein when the processing module determines the biological information detected by the verification device and the biological information in the verifying information database are identical, the processing module sends a corresponding control instruction to the scene module to load in the predetermined association information saved in the preferred setting, to correspondingly link to the platform database to load in corresponding user scenes.

5. The educational metaverse interactive platform as claimed in claim 1, further comprising a platform module coupled with the processing module; wherein the platform module includes a scene module, the scene module is coupled with the platform database to generate a corresponding scene image; wherein the scene module includes a communication scene, wherein an interface arrangement of the communication scene defines a public area and a limited area within the public area; wherein when a virtual character of the user is in the public area, an information transmitted by the user is public; and wherein when the virtual character of the user is in the limited area, the information transmitted by the user is only receivable by corresponding virtual characters of other users who are in the limited area at the same time.

6. The educational metaverse interactive platform as claimed in claim 1, wherein in the scene image corresponding to the scene information, a user is granted management authorization to act as a scene manager, and other users are defined as managed users; wherein the scene manager executes at least one of group association, position association, permission management and status determination for the managed users according to the management authorization; wherein the group association is configured to designate groups among the managed users; wherein the position association is configured to designate the managed user to move to specific coordinates in corresponding scenes; wherein the permission management is configured to control operability of specific capabilities of the managed users in corresponding scenes; wherein the status determination is configured to determine a status of interest of the managed user.

7. The educational metaverse interactive platform as claimed in claim 6, wherein the scene manager executes the group association to group the managed users who are not yet grouped according to a specific method; wherein the specific method is random assignment, average assignment according to specific attributes or extreme assignment according to specific attributes.

8. The educational metaverse interactive platform as claimed in claim 7, wherein when the managed users are already grouped, the scene manager associates the managed users with corresponding seats according to grouping conditions, making the seats of the managed users in the same group adjacent to each other.

9. The educational metaverse interactive platform as claimed in claim 1, further comprising an integration system coupled to the processing module, wherein the integration system includes:

a reality module comprising:

a reality device which is a device in the real world;

a reality controller coupled to the reality device for controlling operation of the reality device;

a virtual module coupled to the reality module and comprising:

a virtual controller for the user to generate an operation input signal in a virtual scene;

wherein the reality controller receives the operation input signal and controls the reality device to generate a corresponding operation according to the operation input signal.

10. The educational metaverse interactive platform as claimed in claim 9, wherein the reality module further includes a reality sensor and basic information; wherein the reality sensor is disposed in at least one of the reality controller, the reality device and an actual environment to detect information of interest from the reality controller, the reality device or the actual environment; wherein the basic information records requirement information and/or limitation information of the actual environment where the reality device is applied; wherein the requirement information is resource information required for one-time operation of the reality device; wherein the limitation information is limitative information that the reality device cannot exceed during an operation; wherein the processing module or the virtual controller receives and calculates a limit value of an operable value of a corresponding reality device based on a relationship between the information of interest and the basic information, for the user to input the corresponding operation input signal within a range of the limit value of the operable value.

* * * * *